(12) United States Patent
Berry

(10) Patent No.: US 7,463,247 B2
(45) Date of Patent: Dec. 9, 2008

(54) FLIP COVER FOR A PORTABLE ELECTRONIC DEVICE

(75) Inventor: Onni Berry, Tampere (FI)

(73) Assignee: Nokia Corporation, Espoo (FI)

( * ) Notice: Subject to any disclaimer, the term of this patent is extended or adjusted under 35 U.S.C. 154(b) by 663 days.

(21) Appl. No.: 10/909,508

(22) Filed: Aug. 2, 2004

(65) Prior Publication Data

US 2006/0022954 A1 Feb. 2, 2006

(51) Int. Cl.
*G09G 5/00* (2006.01)

(52) U.S. Cl. ........................ 345/173; 345/169

(58) Field of Classification Search ............... 345/168, 345/173, 169
See application file for complete search history.

(56) References Cited

U.S. PATENT DOCUMENTS

| 541,444 | A | | 6/1895 | Rumsey | |
|---|---|---|---|---|---|
| 5,584,054 | A | * | 12/1996 | Tyneski et al. | 455/566 |
| 5,646,649 | A | * | 7/1997 | Iwata et al. | 345/173 |
| 6,144,358 | A | * | 11/2000 | Narayanaswamy et al. | 345/102 |
| 6,169,538 | B1 | * | 1/2001 | Nowlan et al. | 345/168 |
| 6,415,138 | B2 | * | 7/2002 | Sirola et al. | 455/90.1 |
| 7,016,711 | B2 | * | 3/2006 | Kurakane | 455/575.1 |
| 2002/0063690 | A1 | * | 5/2002 | Chung et al. | 345/168 |
| 2002/0126097 | A1 | * | 9/2002 | Savolainen | 345/168 |

FOREIGN PATENT DOCUMENTS

| WO | WO 98/19434 | 5/1998 |
|---|---|---|
| WO | WO 03/081880 | 10/2003 |
| WO | WO 00/69150 | 11/2005 |

* cited by examiner

*Primary Examiner*—Bipin Shalwala
*Assistant Examiner*—Afroza Y Chowdhury
(74) *Attorney, Agent, or Firm*—Foley & Lardner, LLP

(57) ABSTRACT

A portable electronic device arrangeable between an open position and a closed position. The portable electronic device includes a display screen that is positioned such that it is at least partially viewable by a user when the portable electronic device is in both the closed position and in the open position. In one embodiment of the invention, the portable electronic device includes a substantially transparent viewing region that enables the user to both view and manipulate the display screen when the portable electronic device is in the closed position.

17 Claims, 1 Drawing Sheet

FLIP COVER FOR A PORTABLE ELECTRONIC DEVICE

FIELD OF THE INVENTION

The present invention relates generally to portable electronic devices. More particularly, the present invention relates to portable electronic devices including a display that is foldable among multiple positions.

BACKGROUND OF THE INVENTION

A variety of portable electronic devices are widely available for both personal and business use. For example, there are a wide variety of types of cellular phones, portable radio communications devices, personal digital assistants (PDA's), portable computers, and combinations thereof currently on the market. These devices provide a wide range of services, ranging from Internet access to electronic mail to personal organization systems, to even various electronic games. One such portable electronic device incorporating a wide variety of features is shown in prior art FIG. 1 and is marketed by Nokia Corporation under the N-GAGE trademark. This particular product serves as both a video gaming device and a portable telephone.

Although these types of portable electronic devices are extremely popular, they currently suffer from a number of drawbacks. Because portable electronic devices are inherently small in size, a tension constantly exists between the size of the device and the size of display screens contained therein. Because portable electronic devices are continuously adding new features, additional input buttons are often needed to implement these features. As more buttons are added, however, it becomes increasingly difficult to incorporate a large display screen to display information. This is particularly true given the fact that the devices as a whole are becoming smaller over time. The problem of a small display screen is particularly troublesome when electronic games are concerned. Electronic games by their very nature include a great deal of graphics with fine detail that move across the screen at an extremely high speed relative to the standard text and icons that are required for personal digital assistants and telephones. Not only is the fine detail of the graphics obscured by a small display screen, but a game can become almost unplayable if the user can't see enough of the activity on the display to follow the action closely.

In addition to the above, another issue that is always being addressed in portable electronic devices is the issue of cost. Many portable electronic devices have both an open position and a closed position. The device, when in the open position, is used for functions such as internet access, accessing one's personal schedule and contacts, and similar tasks. When in the closed position, the device is used for making telephone calls. Although useful, these devices typically require two separate displays, one for when the device is in the open position, and one for when the device is in the closed position. This adds to the complexity and cost of the device.

PCT Publication No. WO 03/081880, assigned to Nokia Corporation and incorporated herein by reference, discloses a mobile electronic device where a touch-sensitive display screen is at least partially viewable when the device is in the closed position. Although useful, a user of this device still would have to open the device if he or she wanted to manipulate the touch-sensitive display screen. This can be quite cumbersome for a user to accomplish in certain situations.

It would therefore be desirable to develop a system that is capable of including a relatively large display screen, while at the same time reducing the cost and complexity of the portable electronic device, as well as being able to manipulate the display screen without regardless of whether the device is in an opened or closed position.

SUMMARY OF THE INVENTION

The present invention is directed to a portable electronic device that is manipulable among a plurality of positions. The portable electronic device includes a display screen that is positioned such that it is at least partially viewable by a user when the portable electronic device is in both a closed position and in an open position, substantially eliminating the need for multiple displays.

In one embodiment of the invention, a portable electronic device, such as a mobile telephone, includes two housing portions. A top housing portion includes a substantially transparent region or window. A bottom housing portion includes a relatively large display. When the device is in a closed position, a user can view a portion of the display through the substantially transparent region. The substantially transparent region in the top housing portion can be formed from a touch-sensitive material either on one side or on both sides such that, when the device is opened, the inside of the substantially transparent area is used as a touch-sensitive mouse. The substantially transparent area can also be flexible, and the display can be touch-sensitive such that, when the device is in a closed position, the user still can use the touch-sensitive capabilities of the display.

DETAILED DESCRIPTION OF THE INVENTION

Figure 1:
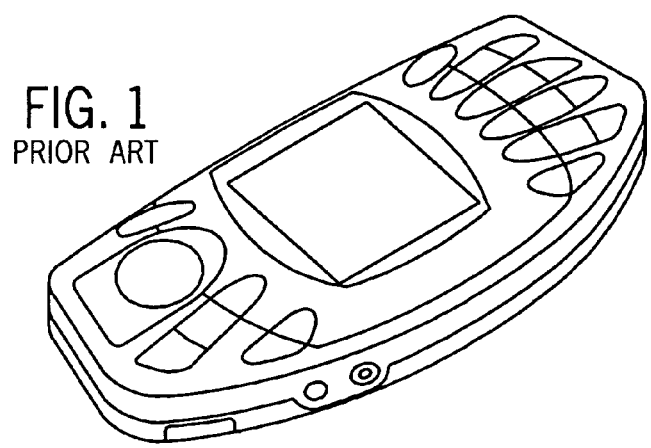
FIG. 1 is a perspective view of a conventional, prior art portable electronic gaming device.

A portable electronic device according to one embodiment of the present invention is shown generally at 30 in FIGS. 2-5. The portable electronic device 30 comprises a housing 32 having an upper portion 34 and a lower portion 36 joined by a hinge element 38, as well as a housing outer portion 44 and a housing inner portion 46. The housing outer portion 44 includes a plurality of outer input device 42 and a substantially transparent viewing region 40 on the upper portion 34.

Figure 2:
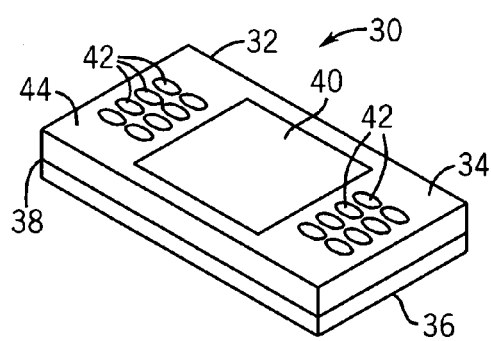
FIG. 2 is a perspective view of a portable electronic device in a closed position, and as constructed in accordance with the principles of one embodiment of the present invention.
Figure 3:
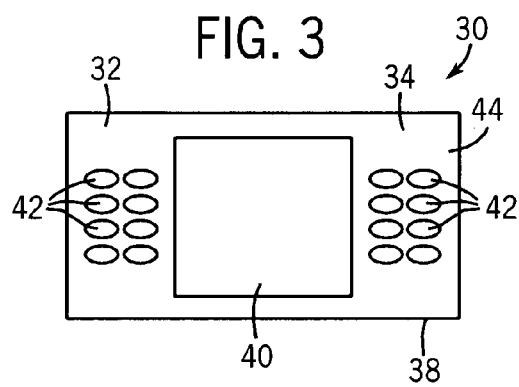
FIG. 3 is a top view of the portable electronic device of FIG. 2 in the closed position.
Figure 4:
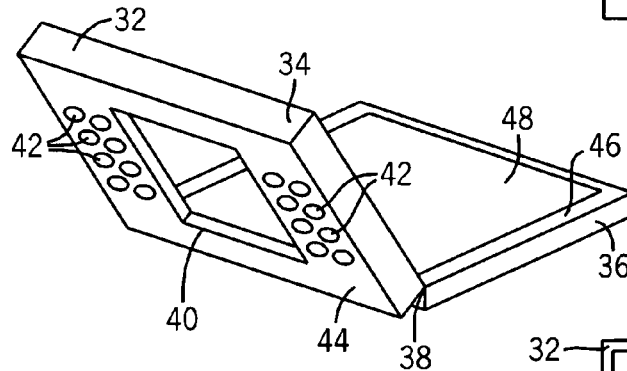
FIG. 4 is a perspective view of the portable electronic device of FIG. 2 in a partially-opened position.
Figure 5:
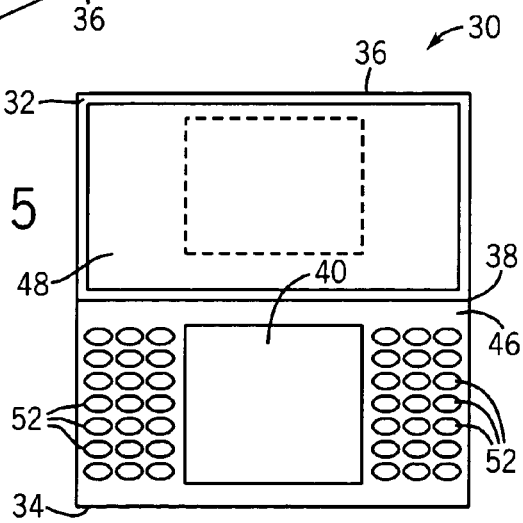
FIG. 5 is a top view of the portable electronic device of FIG. 2 in an open position.

The portable electronic device 30 shown in FIGS. 2-5 is foldable from a "closed" position to an "open" position, with FIGS. 2 and 3 showing the portable electronic device 30 in the "closed" position, FIG. 4 showing the portable electronic device 30 in a partially opened position, and FIG. 5 showing the portable electronic device 30 in an "open" position. A wide variety of devices operate in this manner. One such portable electronic device is a device marketed and sold by Nokia under the COMMUNICATOR brand name, and includes features such as including data and Internet connectivity, word processors, spreadsheets, presentation editors, viewers and a variety of office tools, as well as including various security features and also including items such as a VGA camera, video recorder and other items. However, the principles of the present invention can be applied to a wide variety of electronic devices including, but not limited to, a personal digital assistant without an attached telephone, a personal gaming device, a personal computer, a personal notebook, and other devices, all of which would be understood by those skilled in the art as including computer code embodied in a computer-readable medium.

As is shown in FIG. 5, the housing inner portion 46, in one embodiment of the invention, includes a plurality of inner input devices 52 that are used to actuate the portable electronic device 30. Other input mechanisms known in the art can also be placed on the housing inner portion 46 to provide a user interface, as well as on the housing outer portion 44, on the housing upper portion 34 and/or the housing lower portion 36.

As can be seen in FIG. 4, the substantially transparent viewing region 40 aligns with a display screen 48 positioned within the housing inner portion 46 such that a user is capable of viewing a portion of the display screen 48 even when the portable electronic device 30 is in a "closed" position. This arrangement allows the single display screen 48 to be usable both when the portable electronic device is in the "closed" position and in the "open" position. Additionally, the display screen 48 can also be adjusted relative to the rest of the housing 32 in order to provide an optimal viewing angle for the user. For example, in some lighting it may be desirable to position the housing upper portion 34 at about a forty-five degree angle to the housing lower portion 36, while in other environments it may be desirable to have both the housing upper portion 34 and the lower housing portion 36 resting flat against a surface such as a desk or table.

The display screen 48, in one embodiment of the invention, is touch-sensitive, allowing a user to manipulate icons, text, or images that appear on the display screen 48. For example, many personal digital assistants include such a display screen that allows a user to open and initiate programs, enter text, and otherwise manipulate information by use of a stylus (not shown). Some systems also allow these functions to be performed by a user's finger.

In one embodiment of the invention, the substantially transparent viewing portion 40 is formed from a flexible material such as a soft, but durable, plastic. For a portable electronic device 30 that includes a touch-sensitive display screen 48, having a flexible transparent viewing portion 40 permits a user to manipulate items appearing on the display screen 48 without having to open the portable electronic device 30. This arrangement allows the portable electronic device 30 to give the user many more potential input possibilities than would otherwise be possible with the same device having an inflexible transparent viewing portion 40. In this arrangement, the user can not only manipulate items on the display screen 48 using a finger and/or a stylus, but he or she can also use conventional outer input devices 42 located on the housing outer portion 44. The outer input devices 42 can take a variety of forms, including but not limited to computer keys using virtually any functional system, a computer mouse, switches, buttons or other devices. The same devices could also be used for the inner input devices 52.

In one embodiment of the invention, the portable electronic device is also capable of adjusting the percentage of the display screen 48 that is activated at a given time. As shown in FIG. 5, when the portable electronic device 30 is in the "open" position, the display screen 48 is completely unobstructed. In this position, the entire display screen 48 is activated, permitting a user to view items on any portion of the display screen 48. This is particularly beneficial in the area of video games, where a larger screen is especially beneficial. On the other hand, when the portable electronic device 30 is in the "closed" position, only a portion of the display screen 48 is viewable through the substantially transparent viewing portion 40. This portion of the display screen 48 is shown in phantom in FIG. 5. In the "closed" position, the user cannot even view material that is positioned outside of the substantially transparent viewing portion 40. Therefore, in one embodiment of the invention, the portion of the display screen 48 outside the substantially transparent viewing portion 40 is deactivated when the portable electronic device is in the "closed" position. Alternatively, the portable electronic device 30 can be programmed such that, although no part of the display screen 48 is deactivated, no material appears on the portion of the display screen 48 outside the substantially transparent viewing portion 40 when the portable electronic device 30 is in the "closed" position. In either event, these features and others described herein can all be implemented by the computer software containing computer code and stored within the portable electronic device 30.

Additionally, the substantially transparent viewing portion 40 can also include additional touch-sensitive capabilities therein. In the embodiment shown in FIGS. 2-5, the side of the substantially transparent viewing portion 40 on the housing inner portion 46 can serve as a touchpad for the portable electronic device 30 when the portable electronic device 30 is in the "open" position. In a touchpad, the movement of a user's finger across the touchpad results in a corresponding movement of a cursor on the display screen 48. Touchpads are widely used in laptop computers where space can also be at a premium. By incorporating the touchpad into the back side of the substantially transparent viewing portion, what would otherwise be "dead space" on the housing inner portion 46 is put to use as an accurate and highly useful input device, while eliminating the need for a touchpad to be placed elsewhere on the portable electronic device 30.

In addition, if the substantially transparent viewing portion 40 includes touch-sensitive capabilities, then it is also possible for the side of the substantially transparent viewing portion 40 on the housing outer portion 44 to also have these touch-sensitive capabilities available to the user. For example, when the portable electronic device 30 is in the "closed" position of FIGS. 2 and 3, the user could manipulate the touch-sensitive capabilities of the substantially transparent viewing portion 40 in order to work with the portion of the display screen 48 that falls within the substantially transparent viewing portion 40 when the portable electronic device is in the "closed" position.

While several embodiments have been shown and described herein, it should be understood that changes and modifications can be made to the invention without departing from the invention in its broader aspects. For example but without limitation, the substantially transparent region 40 does not have to be positioned to corresponding to the middle display screen 48. Instead, the substantially transparent region 40 could be positioned closer to one particular edge of the housing 32. Additionally, it is also possible for the housing upper portion 34 to be removable and interchangeable with the housing lower portion 36, enabling a user to use the portable electronic device 30 for a wide variety of additional purposes. Various features of the invention are defined in the following claims.

What is claimed is:

1. A portable electronic device, comprising:
 a housing having an upper portion and a lower portion and including an open position and a closed position; and a display operatively connected to the housing for providing information to a user, wherein the display is positioned on the lower portion of the housing, and wherein the upper portion of the housing includes a substantially transparent window that aligns with the display when the housing is in the closed position such that at least a portion of the display is viewable by the user when the housing is in the closed position, wherein the housing includes an inner portion and an outer portion, and wherein the substantially transparent window serves as a user interface on the inner portion when the housing is in the open position.

2. The portable electronic device of claim 1, wherein the substantially transparent window is flexible such that, when the housing is in a closed position, an actuation of the substantially transparent window by the user results in a corresponding actuation of the display.

3. The portable electronic device of claim 2, further comprising a processor operatively connected to the display, and wherein the processor adjusts the portion of the display screen that is activated depending upon whether the housing is in the open position or the closed position.

4. The portable electronic device of claim 3, wherein only the portion of the display that is viewable by a user through the substantially transparent window is activated when the housing is in the closed position.

5. The portable electronic device of claim 2, wherein the substantially transparent window includes touch-sensitive capabilities.

6. The portable electronic device of claim 1, wherein the display is a touch-sensitive display.

7. The portable electronic device of claim 1, wherein the upper portion is removable and interchangeable with the lower portion.

8. A module for use in a portable electronic device, comprising:

a housing having an upper portion and a lower portion and including an open position and a closed position; and a display operatively connected to the housing for providing information to a user, wherein the display is positioned on the lower portion of the housing, and wherein the upper portion of the housing includes a substantially transparent window that aligns with the display when the housing is in the closed position such that at least a portion of the display is viewable by the user when the housing is in the closed position, wherein the housing includes an inner portion and an outer portion, and wherein the substantially transparent window serves as a user interface on the inner portion of the housing when the housing is in the open position.

9. The module of claim 8, wherein the substantially transparent window is formed from a flexible material.

10. The module of claim 8, wherein the portion of the display that is activated is automatically adjusted depending upon whether the substantially transparent window is in the open position or the closed position.

11. The module of claim 10, wherein only the portion of the display that is viewable by a user through the substantially transparent window is activated when the substantially transparent window is in the closed position.

12. The module of claim 8, wherein the display is a touch-sensitive display.

13. A computer software program, embodied in a computer readable medium, for enabling manipulation of a display on a portable electronic device including a substantially transparent window movably and operatively connected to the display and movable between an open position and a closed position, comprising:

computer code for displaying information generated on the display;

computer code for determining whether the substantially transparent window is in the open position or the closed position; computer code for displaying information on the entire display if the substantially transparent window is in the open position;

computer code for displaying information on only a portion of the display if the substantially transparent window is in the closed position, and computer code for processing information based upon manual actuation of the substantially transparent window on an inner portion of a housing when the substantially transparent window is in the open position.

14. The computer software program of claim 13, further comprising computer code for processing information based upon manual actuation of the display.

15. A method for enabling manipulation of a display on a portable electronic device, comprising:

providing a display and a substantially transparent window movably and operatively connected to the display, the substantially transparent window being movable between an open position and a closed position;

determining whether the substantially transparent window is in the open position or the closed position;

displaying information on the entire display if the substantially transparent window is in the open position;

displaying information on only a portion of the display if the substantially transparent window is in the closed position; and processing information based upon manual actuation of the substantially transparent window on an inner portion of a housing when the substantially transparent window is in the open position.

16. The method of claim 15, further comprising processing information based upon manual actuation of the display.

17. The module of claim 8, wherein the substantially transparent window serves as touchpad on the inner portion of the housing when the housing is in the open position.

* * * * *